United States Patent Office 3,372,808
Patented Mar. 12, 1968

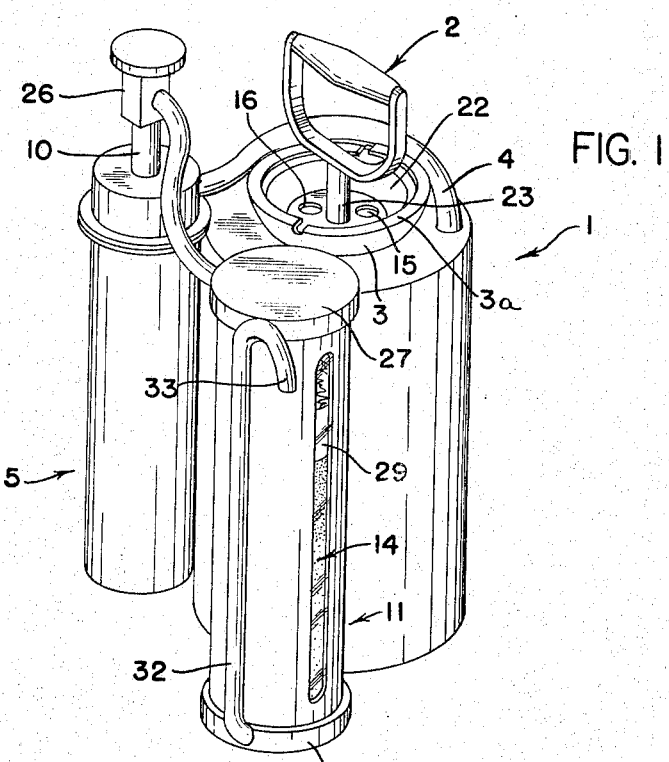
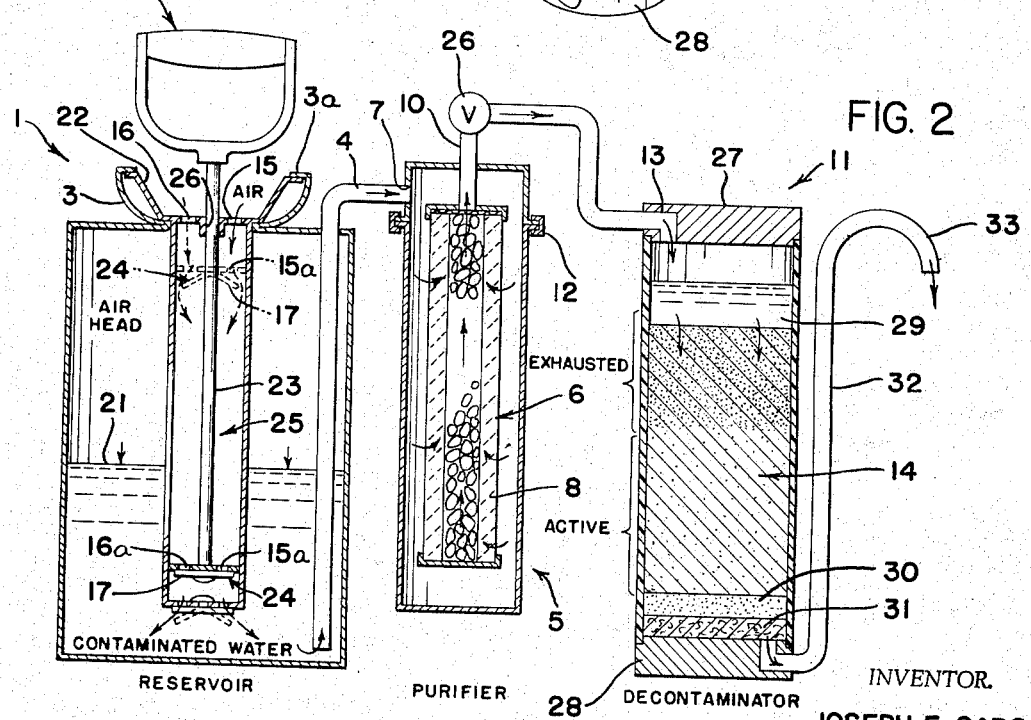

3,372,808
APPARATUS FOR REMOVING RADIOACTIVE
MATERIALS FROM WATER
Joseph F. Sabo, 8680 Lewis Road,
Olmsted Falls, Ohio 44138
Continuation of application Ser. No. 157,750, Dec. 7, 1961. This application June 9, 1966, Ser. No. 556,521
4 Claims. (Cl. 210—95)

ABSTRACT OF THE DISCLOSURE

A physically integrated filter unit for purifying and removing radioactive materials from water which includes a closable reservoir having an inlet port and an outlet port. A pump is provided in the reservoir for creating a pressure head in said reservoir. A silver impregnated ceramic filter having an outlet port and an inlet port is in fluid communication with the outlet port of said reservoir means and ion-exchange means is likewise in fluid communication with the outlet port of said ceramic filter through which water to be purified is passed. The water to be purified is passed from the reservoir to the ceramic filter and then into and through the ion-exchange means. A variable fluid flow control valve is provided at the outlet of the filter unit to regulate the output flow of filtered water under pressure from said unit.

---

This is a continuation of my copending application Ser. No. 157,750, filed Dec. 7, 1961, and now abandoned.

This invention relates to an apparatus for treating radioactive water and more specifically to an apparatus for removing radioactive materials from water. Still more specifically, this invention relates to an apparatus for removing bacteria and radioactive materials from water to be used for human consumption.

The source of our water is the rain and snow which falls to the ground, part of which evaporates, part collects on the surface, and part passes into the ground. The part that collects on the surface forms lakes, ponds, rivers, etc.; the part that sinks into the ground forms wells, underground streams, springs, etc. Both the underground and surface water, however, are sources of water for human and animal consumption. For human consumption, most of the surface water requires treatment to remove bacteria which can cause typhoid, dysentery, cholera, and the like. Water, being a great solvent, tends to dissolve and disintegrate material, e.g., radioactive salts, bacteria, and the like, with which it comes into contact. These solvent properties are increased by the presence of carbon dioxide, much of which is obtained from the soil. Ground water, such as well water, contains less bacteria but more carbon dioxide and mineral matter than surface water, since it remains in contact with the rocky strata of the earth for a longer period of time. As the surface water passes through the earth it is filtered and partially purified, thus eliminating most of the bacteria but increasing the mineral content. In most instances, the underground water is safe for consumption without any treatment, whereas most surface waters must be treated chemically before being used. In the event of a nuclear explosion, however, both sources can become contaminated with radioactivity and thus would require purification.

Since all of our water comes from these two sources, it can be seen readily how radioactive fallout due to nuclear explosions can contaminate both the surface and the underground water. Radioactive waste or fallout is characterized in that it cannot be neutralized or made nonhazardous through any known chemical or biological means. Physical removal of the radioactive material is the only effective way to treat water thus contaminated. While there are certain radioactive materials which exist in nature, i.e., uranium and thorium, their concentration in normal surface waters range only from about $10^{-10}$ to $10^{-8}$ microcuries per milliliter, which is below the harmful level. With a nuclear exposion, however, large quantities of radioactive material will be introduced into the atmosphere, which will be carried by the wind, rain, and snow, and deposited in the water as fallout. One of the most harmful products of a nuclear explosion is strontium 90, which will contaminate most of the sources of water.

The problem of decontaminating water containing radioactive fallout is particularly difficult since the fission products usually are different atom species mixed together. Known filtration methods, i.e., sand filters or the like, will remove some of the larger particles of this radioactivity but unfortunately the most toxic of the mixed fission products, such as radioactive strontium, calcium, cesium, and barium cannot be removed by simple filtration and, therefore, must be removed by another method.

The contaminants in the form of radioactive fallout, debris, or water-soluble isotopes would be predominant in the water immediate to the blast thus necessitating a means of removing this radioactivity in cases of emergency where the normal supply of city water is shut off. It is to be expected that in the event of an atomic explosion, the facilities normally used in supplying pure water to the public would be damaged or completely lost and an auxiliary supply would be needed. This supply, however, undoubtedly would contain a detrimental amount of radioactive debris or radioactive isotopes which remains in the water even after being treated by conventional filtration procedures. Water containing a lethal amount of radioactivity obviously would not be suitable for human use and thus it would be important to have a portable unit which could supply or purify at least a small amount of water for emergency purposes, such as for drinking, food, pharmaceutical, medical uses, and the like. A small pump-type unit, capable of supplying about one gallon of purified water per minute would be satisfactory for most of these emergencies. A portable unit of this type should be simple in construction and easy to operate without any danger of exposing the operator to radioactivity.

Broadly the apparatus of this invention comprises a physically integrated device for purifying and removing radioactive materials from water, comprising reservoir means having an inlet port and closure therefor and an outlet port, pump means for creating a pressure head in said resorvoir means, silver impregnated ceramic filter means having an outlet port and an inlet port in fluid communication with the outlet port of said reservoir means, ion-exchange means in fluid communication with the outlet port of said ceramic filter means through a variable flow control means, and means for removing water from said unit which has been passed through said ceramic filter means and said ion-exchange means under pressure from said pump means.

Accordingly, it is an object of this invention to provide a novel apparatus for purifying water.

It is another object of this invention to provide a new and novel filtering apparatus for removing radioactive materials from water.

It is still another object of this invention to provide a filter means for removing bacteria and radioactive materials from water for human consumption.

It is a further object of this invention to provide a filter means for purifying water for human consumption by removing from solution radioactive materials.

It is a still further object of this invention to provide a filtering means for purifying water by removing all particles in excess of one micron.

It is still another object of this invention to provide a portable unit to be used for supplying pure water.

It is an even further object of the invention to provide a filter means for purifying and decontaminating water.

These and other objects of the invention will become apparent from a more complete and detailed description, as follows.

In the drawings:

FIG. 1 is a perspective view of the portable water purifier and decontaminator unit;

FIG. 2 is a detailed diagrammatic view of the apparatus, particularly adapted to carry out the purification and decontamination of water according to this invention.

Referring now to the drawing in detail, the embodiment illustrated in FIG. 2 discloses a reservoir 1 containing a hand pump 2 for purposes of building up the required amount of pressure needed to force the water through the system. In operating the handle of the pump up and down, air enters 15, 15a, 16, and 16a, opening and closing a resilient butterfly or flap-type check valve, and building up a head of pressure.

The air pressure exerted on the surface of the water 21 causes the water to flow upward through conduit 4 to the top of the purifying element 5. The flange 22 of the hand pump is locked into position with a corresponding flange 3a located on the periphery of the filler port 3. The pump comprises a piston rod 23 with a handle at one end and the perforated piston head 24 at the other end. The piston rod is slidably engaged in an enclosed chamber 25 at 26.

The purifying element 5 is connected integrally to the reservoir 1 and comprises a conventional snap lock 12 to permit removal of the lower half of the element. A cylindrical filter cartridge 6 is enclosed within the purifier 5 and is connected to a conduit 10. A valve 26 is located in the conduit and can be adjusted to regulate the flow of water going from the filter element to the decontaminator. The decontaminator comprises a cylindrical tank 11 integrally connected to the reservoir, having top and bottom seals 27 and 28, respectively. The conduit 10 enters the top of the decontaminator at port 13 in the top seal 27. The head of water 29 passes down through a resin material 14 and then through a layer of sand 30 and glass wool 31. The water, under pressure, passing through the glass wool 31 enters the conduit 32 located in the bottom of seal 28 and passes up through the conduit to the outlet port 33.

It has been discovered that water which contains large amounts of bacteria, radioactive debris, or water-soluble isotopes, can be decontaminated or purified for human consumption by using the above apparatus. Water containing radioactive fallout or radioactive isotopes, bacteria, chlorides, fluorides, carbonates, silicates, sulfates, or other radioactive salts and water-soluble components, can be purified by passing it through the unit, which comprises a silver-containing diatomaceous earth ceramic filter and an ion-exchange resin. The contaminated water is passed under regulated pressure through a combination of the ceramic filter and ion-exchange resin to improve the taste, color, and purity, making it safe for human consumption. The safe tolerance level for water containing radioactive fission products is approximately $4 \times 10^{-6}$ microcuries per cc. It would appear, however, that in an emergency, water with many times the accepted tolerance may have to be used, unless an emergency purifying unit can be provided.

In addition to the production of radioactive debris and isotopes, a nuclear explosion differs from conventional explosions in that there is a large amount of deleterious rays, as well as intense heat and light. It is the fission products which remain after the explosions, however, that contaminate everything with radioactive emitting radiations capable of producing harmful effects in most living organisms. If the nuclear explosion occurs relatively close to the ground and a considerable amount of dirt and debris are attracted to the radioactive cloud, then the fallout would have to be considered much more dangerous, particularly when the detonation takes place at a low level above the surface of water.

Nuclear explosions are accompanied by the emission of gamma rays, or by the expulsion of relatively small particles, such as alpha particles, protons, neutrons, or electrons, and these may contaminate the water supply through different sources. For example, fallout particles may drop in the reservoir, or accumulate on water containers, because of a nuclear explosion in or near the reservoir or source of water. In surface waters, particularly, radioactive contaminants will tend to be absorbed by the suspended colloidal matter normally found in the water. This radioactive matter eventually will settle and be absorbed at the bottom of the reservoir. It is this source of contamination which will persist over long periods of time and require a continuous decontamination of the water.

Water is purified according to this invention by passing it, under pressure, through a silver-impregnated diatomaceous earth ceramic filter, a bed of activated carbon, and finally through a specific mixture of ion-exchange resins. The contaminated water is pumped at pressures ranging from about 40 to 900 pounds per square inch through the silver-impregnated diatomaceous earth filter containing a bed of activated carbon to remove the finely suspended matter and to improve the color and taste of the water. More specifically, the ceramic filter comprises a silver-impregnated diatomaceous earth which is compressed to a porosity of about one micron or $\frac{1}{25,000}$ inch.

The silver impregnated in the ceramic filter acts as a sterilizing agent in preventing the growth of bacteria in the pores of the filter. The activated carbon, through which the water passes after first having passed through the porous filter, removes any unpleasant taste or odor. After the water has been filtered to remove matter having a particle size greater than one micron, it is then deionized by passing it through a porous bed of an ion-exchange resin to remove any of the radioactive materials in solution. Radioactive isotopes, such as strontium 90, for example, may be in the water and thus removed by the ion-exchange resin.

A specific method of decontaminating water containing radioactive materials is illustrated by FIG. 2. Here polluted water is purified by passing it to a galvanized steel tank 1 which contains a cylinder hand pump 2 with a filler inlet port 3 for purposes of adding the water and building up pressures. The capacity of the tank may range from about 1 to 20 gallons but for most practical purposes, the 2-gallon reservoir is preferred since it makes the unit portable. The water, under pressure, passes from the bottom of the tank to a ⅜″ conduit 4 to the top of a purifying element 5. The purifying element is a cylinder made of stainless steel but can be made of other materials, such as aluminum, fiberglass, or the like, when it is important to keep the overall weight of the unit at a minimum.

The cylinder contains a ceramic filter cartridge 6. The contaminated water enters at the top of the purifying element 5 at inlet 7 filling the element 5 and forcing its way through the filter cartridge 6. The filter cartridge 6 is a silver-impregnated diatomaceous earth ceramic member having a tubular shape and is prepared by compressing a silver-containing diatomaceous earth mixture to a porosity of about one micron or 1/25,000 inch. The walls 8 of the cartridge 6 are approximately ¾" thick and are impregnated uniformly with silver flakes so as to inhibit bacteria growth. The center or core of the cartridge is approximately ⅞" in diameter and is filled with flakes of activated carbon. The particle size of the carbon is sufficient to give maximum contact with the water, thus eliminating any unpleasant odors, taste, or color.

The contaminated water passing under pressure through the porous walls of the cartridge is purified by the removal of bacteria and particle sizes of one micron or larger. In addition to the bacteria, the small pores of the cartridge filter out any radioactive material that may have settled on debris normally found suspended in water, such as radioactive dust particles. The activated carbon located in the center of the cartridge removes any unpleasant taste or sweetens the water as it passes through the carbon to the top of the purifying element 5 and through the outlet 10 to the top of the decontaminator 11. These filter cartridges can be used indefinitely so long as they are cleaned regularly. If too large an amount of foreign material collects on these filters, however, the flow of water will be reduced even though the pressure on the system is maintained. Thus, the filter cartridge 6 can be cleaned by removing it from the purifying element 5 by opening the snap-lock arrangement 12 and removing the lower section. The filter cartridge 6 can be cleaned periodically by brushing it in clear water. The frequency of the cleaning will depend on the amount of dirt and bacteria in the water and on the amount that accumulates on the filter. The purified, or bacteria-free water, then passes to the decontaminator 11 at 13 to the top of an ion-exchange resin bed 14. The ion-exchange resin is chosen specifically to remove substantially all of the radioactive ions that may be found in the contaminated water. Of the many known resins, a preferred resin is Amberlite MB-3, which is an intimate mixture of hydrogen- and hydroxyl-containing ions illustrated by $R_1SO_3H$ and $R_2NCH_3(CH_2)_2OH$, wherein $R_1$ and $R_2$ are organic radicals. This particular resin contains an indicating dye which changes color from a deep blue-green to yellow as the deionizing capacity of the resin is exhausted. Thus, as the water passes down through the resin, which removes the radioactive materials from solution, its color changes to yellow, indicating that it is exhausted and should be replaced.

The steel or lead-coated container can have a window-glass slit along one side to indicate when the resin is exhausted. The bed of resin comprises a mixture of cations and anions which may be regarded as a countless number of anion and cation exchange columns, one after another, and can be expected to give an effluent of very high quality. Leakage of ionic solids can be minimized in a deionization system by using a series of columns consisting of alternating beds of cation and anion exchange resins. The bed of resin, i.e., Amberlite MB-3, is prepared by filling the decontaminator to a depth of at least about 12 inches or more, which is approximately three pounds. As the contaminated water passes down through the resin, initially, a yellow band forms at the top and gradually, as it is exhausted, proceeds further down the column until the entire bed is yellow. At this point, the exhausted resin is discarded and a fresh charge is placed in the decontaminator. The preferred resin is Amberlite MB-3, which is a mixure of strongly basic anions, in the hydroxide form, and strongly acidic cations, in the hydrogen form. This resin has a particle size of 20–50 mesh and a density of 0.69 gram per milliliter, or 43 pounds per cubic foot. The radiactive ions in the water are removed by having the cations exchanged for hydrogen ions and the anions exchanged for hydroxyl ions as the water passes through the unit.

The hydrogen and hydroxyl ions react almost instantly with each other to form water molecules so that the effluent coming from that unit is substantially pure water. Virtually all of the ionic solids originally in the water are removed by the decontaminator, as illustrated in Table I:

*Table I.—Quality of water obtained by the various methods of treatment*

| Type of water: | Quality (electrical resistance in ohms per cm.) |
|---|---|
| Water after 28 distillations in quartz | 23,000,000 |
| Water treated or passed through Amberlite MB-3 (hydrogen and hydroxyl ion-exchange resin) | 18,000,000 |
| Water after 3 distillations in glass | 1,000,000 |
| Water after a single distillation in glass | 500,000 |
| Approximate quality of USP distilled water (ionic solid content of USP distilled water does not exceed 5 parts per million) | 100,000–500,000 |

Thus, for example, it is noted that the ionic solid content of the water passed through the Amberlite resin has a smaller amount of ionic solids than distilled water, as indicated by the electrical resistance in ohms per cm. As the solid content decreases the ohms per cm. increase. The frequency at which the resin will have to be replaced in the decontaminator will depend on the water source and the concentration of ionized solids. Normally, approximately one pound of Amberlite MB-3 is sufficient to deionize as much as 100 gallons of water.

The purifying and decontaminating system as outlined above, with water pressures through the system being about 60 p.s.i., will purify water at a rate of approximately one gallon per minute. Consequently, however, if larger volumes of water are needed, additional purifying elements may be arranged in parallel to give volumes 5 to 6 gallons per minute at pressures ranging from 50 to 60 p.s.i. Likewise, a parallel system of decontaminators can be arranged to handle the additional flow of water coming from the purifying elements. If a higher degree of deionization is required, additional decontaminator units may be arranged in series. Thus, by using a series a majority of the ionic solids being removed by the first decontaminator would contain a larger amount of radioactivity and, accordingly, should be in a lead or lead-coated container, whereas the subsequent decontaminator can be enclosed in a container which permits the resin to be seen for purposes of indicating when it is exhausted and needs to be changed. For example, when two decontaminators are arranged in series, then the detecting means should be in the second decontaminator and as the color at the top of the second decontaminator begins to change from blue to yellow, this will indicate that the resin in the first decontaminator is exhausted and should be replaced with a fresh resin. Since most of the radioactivity will accumulate in the first decontaminator, there is an advantage is using a series of decontaminators, whereby the first decontaminator is enclosed in a steel or lead container which will act as a shield against accumulation of radioactivity.

It is essential in this process of water decontamination to maintain a water pressure of about 40 to 90 p.s.i., with the preferred being 50 to 60 p.s.i. In addition to the water pressure, it is essential that the contaminated or polluted water be passed through the purifying element before being passed through the decontaminator, since bacteria would contaminate the resin and multiply on any nitrition materials collected during operation.

Water treated according to the method of this invention has substantially no bacteria and an ionic solid content of less than one part million. The effectiveness of the purifying element 5 can be shown by the data in Table II.

Table II

The water was tested by adding broth cultures of *Eschericha coli* and bacteria from human feces to the water. This water was forced through the ceramic filter 6, under pressure, at a rate of approximately one-half gallon per minute. Samples of the filtered water were taken after one quart and again after two gallons had passed through the filter. Bacteria counts were obtained by standard methods with the results indicated.

| Water specimen tested | Number of bacteria per milliliter | | |
|---|---|---|---|
| | Before filtration | After filtration | |
| | | 1 qt. | 2 gals. |
| Tap water | 5 | 0 | 0 |
| Water containing *Escherichia coli* | 1,600,000 | 0 | 0 |
| Water containing bacteria from human feces | 10,800,000 | 0 | 0 |

Thus, according to the above data, the purifying element of the water decontaminating and purifying unit was effective to remove practically all the bacteria in the water. In instances where the source of water to be treated contains colloidal particles or particles less than one micron and has a high color content, it may then be advisable to treat the water prior to passing it through the ceramic filter. A coagulant can be used to coagulate the colloidal particles to a larger particle known as floc which can be removed easily by the filter. The coagulants primarily used for treating water are aluminum and iron sulfates. They are acidic and will react with the alkalinity of the water to produce sulfates of other metals, such as magnesium, calcium, sodium, etc. The amount of coagulant to be used in each case will depend on the water and its acidity. Maximum coagulation is obtained at a specific pH depending on the coagulant used. Thus, for example, for an aluminum coagulant the pH of the water usually is from about 5.5 to 6.8.

The data in the following tables illustrates the effectiveness of the water purification unit illustrated in FIG. 1, to remove bacteria and suspended or solubilized particles that may be radioactive:

Table III.—Bacteriological analysis

| | Sample of water taken from polluted creek plus "spiked" elements | Water taken from purifier unit output, 1 pint specimen collected after 1st 3 quarts output |
|---|---|---|
| Total bacteria, 37° Agar Plate Count, per 1 ml | 1,400,000 | 0.0 |
| *E. coli* per 100 ml | 1,000,000 | 0.0 |

Table IV.—Mineral analysis

| | Polluted Raw Creek Water | Added "Spiking" Salts | Product from Purifier Unit 3rd—1 qt. Specimen |
|---|---|---|---|
| pH | 7.20 | | 6.50 |
| Conductivity, as grains NaCl per gallon | 17.0 | | 0.06 |
| Total Solids, p.p.m. | 331.0 | | 1.2 |
| Dissolved Solids, p.p.m. | 320.0 | | 1.2 |
| Suspended Solids, p.p.m. | 11.0 | | 0.0 |
| Loss on Ignition, p.p.m. | 73.0 | | 0.0 |
| Turbidity, p.p.m. | 15.0 | | 0.0 |
| Total Alkalinity as p.p.m. $CaCO_3$ | 132.0 | | 1.0 |
| Phenol. alk. as p.p.m. $CaCO_3$ | 0.0 | | 0.0 |
| Free $CO_2$ | 10.0 | [1] 12.0 | 2.0 |
| Total Hardness, p.p.m. $CaCO_3$ | 178.0 | | 0.40 |
| Calcium (Ca), p.p.m. | 50.5 | 400.0 | 0.12 |
| Magnesium (Mg), p.p.m. | 12.6 | 80.0 | 0.03 |
| Iron (Fe), p.p.m. | 0.20 | 10.0 | 0.00 |
| Silica ($SiO_2$), p.p.m. | 4.0 | 31.0 | 0.00 |
| Sulfates ($SO_4$), p.p.m. | 83.5 | 333.0 | 0.01 |
| Chlorides (Cl), p.p.m. | 43.8 | 710.0 | 0.10 |
| Nitrates ($NO_3$), p.p.m. | 0.27 | | 0.00 |
| Ammonia ($NH_3$), p.p.m. | 6.69 | | 0.00 |
| Fluorides (F), p.p.m. | 0.55 | 10.0 | 0.00 |

[1] Added as carbonate.

Table V.—Visual examination and odor

| | Polluted Input Sample | Purifier Unit Output |
|---|---|---|
| Appearance | Cloudy, Turbidity=15 p.p.m. | Crystal Clear, Colorless. |
| Odor | Very Offensive Sewage | Odorless. |

In preparing the specimens to be tested as indicated above, a specimen of polluted, raw, creek water was analyzed for its bacteria and mineral content. The known-polluted water was further "spiked" with known quantities of soluble salts. One and one-half gallons of this contaminated water was introduced into the purifying unit's input tank. The tank was pressurized and the opening adjusted to give an output flow of approximately one quart of purified water per minute.

After the first two quarts of output water, a one-quart sample was collected for mineral analysis. Following this specimen, a second one-pint sample was collected in a sterile, flint glass bottle for bacteriological analysis. The specimens were subjected, respectively, to mineralogical and bacteriological analyses using "Standard Methods for the Examination of Water and Sewage" as prepared, approved, and published jointly by the American Public Health Association and the American Water Works Association.

It should be noted from the above data, that the total solid content in the water coming from the purification unit is less than that normally found in U.S.P. distilled water. The amount of hardness added to the raw water as carbonates of calcium, magnesium, iron, etc., and subsequently found in the purified water, was less than 0.1 part per million. The effectiveness of this portable unit in removing substantially all of the dissolved and suspended radioactive materials is illustrated by the data given in the tables. The purifying element coperates with the decontaminator to remove both the suspended and water-soluble materials which ordinarily would be expected to be radioactive or to contain radioactive particles in the event of an atomic explosion. The combination of the purifier and decontaminator are arranged in a single portable unit such that the water coming from the purifier is free of bacteria before being treated by the ion-exchange resin. This sequence is essential to avoid bacteria growth in the resin and to control the pressure exerted on the ion-exchange bed.

It was found further that in this arrangement the pressure built up in the reservoir is sufficient to obtain a constant flow of water through the purifier and that this same rate of flow can be continued through the decontaminator without adversely affecting the effectiveness of the resin. The rate of flow coming from the filtering element can be adjusted by providing the valve 26 with a bleeder adjustment such that the reaction time between the contaminated water and the ion-exchange resin is sufficient to permit removal of substantially all insoluble and soluble radioactive particles.

To illustrate further the effectiveness of the unit in providing pure water the following additional tests were run.

One gallon of synthetic sea water was prepared in accordance with ASTM designation D1141–52, by dissolving salts in distilled water to give the following contents:

Table VI

| Compound: | Concentration, grams per liter |
|---|---|
| NaCl | 24.53 |
| $MgCl_2$ | 5.20 |
| $Na_2SO_4$ | 4.09 |
| $CaCl_4$ | 1.16 |
| KCl | .695 |
| $NaHCO_3$ | .201 |
| KBr | .101 |
| $H_3BO_3$ | .027 |
| $SrCl_2$ | .025 |
| NaF | .003 |

| Compound: | Concentration, grams per liter |
|---|---|
| Chlorinity | 19.38 |
| pH | 8.2 |

The synthetic sea water thus prepared was passed through the unit at about one quart per minute, with the second quart being submitted to chemical analysis. The results of this analysis are indicated in the following table:

*Table VII.—Synthetic sea water run through unit*

| | |
|---|---|
| Taste | Tasteless |
| pH | 6.1 |
| Conductivity | [1] 0.09 |
| Total solids _____p.p.m__ | 6.0 |
| Carbonates ($CO_3$) | 0.0 |
| Bicarbonates ($HCO_3$) | 3.5 |
| Chlorides and bromides as (Cl) | 1.5 |
| Sulfates ($SO_4$) | 0.10 |
| Hardness (as $CaCO_3$) | 2.00 |
| Calcium (Ca) | 0.60 |
| Magnesium (Mg) | 0.12 |
| Fluorides (F) | 0.00 |
| Free $CO_2$ | 5.0 |

[1] G.p.g. as NaCl.

One gallon of "brackish" water was prepared by diluting 0.10 gallon of the synthetic sea water to one gallon with distilled water. The "brackish" water was then passed through the unit with the second quart being submitted to chemical analysis, with the results as given in Table VIII.

*Table VIII.—"Brackish" water run through unit*

| | |
|---|---|
| Taste | Tasteless |
| pH | 5.9 |
| Conductivity | [1] 0.28 |
| Total solids _____p.p.m__ | 7.0 |
| Carbonates ($CO_3$) | 0.0 |
| Bicarbonates ($HCO_3$) | 4.0 |
| Chlorides and bromides as (Cl) | 1.0 |
| Sulfates ($SO_4$) | 0.10 |
| Hardness (as $CaCO_3$) | 1.00 |
| Calcium (Ca) | 0.30 |
| Magnesium (Mg) | 0.06 |
| Fluorides (F) | 0.00 |
| Free $CO_2$ | 7.0 |

[1] G.p.g. as NaCl.

It should be noted from the above test data that large amounts of sodium chloride, together with other metal salts and acids, can be removed from the synthetic sea water by passing it through the purification unit of this invention. In cases of atomic explosion, water containing high salt content likewise would contain an appreciable amount of radioactivity. With the purification unit described such salt water can also be decontaminated in case of emergency to produce small quantities of water for human consumption.

It is to be understood that the above description is merely illustrative and that it is intended to include all modifications and alterations within the spirit of the invention as more particularly pointed out in the appended claims.

What is claimed is:

1. A physically integrated device for purifying and removing radioactive materials from water comprising a reservoir means having an inlet port and a closure therefor and an outlet port, pump means mounted within said reservoir for forcing water from said reservoir through said outlet port, a purifier in fluid communication with said outlet port of said reservoir, said purifier comprising a tubular, silver impregnated ceramic filter means in fluid communication with said reservoir, said tubular ceramic filter means being closed at one end and having an outlet port at the other end thereof, a decontaminator, means providing fluid communication between said outlet port of said tubular ceramic filter and said decontaminator, said means providing fluid communication between said outlet port of said tubular ceramic filter and said decontaminator including variable flow control means, said decontaminator comprising a body of an ion exchange resin and an outlet port leading therefrom, whereby a flow pattern for impure water is provided from said reservoir to said purifier, through said tubular ceramic filter means, and then through said ion exchange resin.

2. The device of claim 1 in which activated carbon is inserted in the flow path between the ceramic filter means and the variable flow control means.

3. The device of claim 1 in which the ion-exchange means is a resin monobed comprising an intimate mixture of hydrogen and hydroxyl ions.

4. The device of claim 3 in which the ion exchange resin contains an indicator which changes color when the resin becomes exhausted.

References Cited

UNITED STATES PATENTS

| 2,434,958 | 1/1948 | Quinn | 210—258 |
| 2,752,309 | 6/1956 | Emmons et al. | 210—290 X |

FOREIGN PATENTS 473,979   10/1937   Great Britain.

OTHER REFERENCES

Swope: Mixed Bed Ion Exchange for the Removal of Radioactivity, Jour. AWWA, August 1957, vol. 49, pp. 1085 and 1099.

SAMIH N. ZAHARNA, *Primary Examiner.*